United States Patent [19]

Van Fossen et al.

[11] Patent Number: 5,024,294
[45] Date of Patent: Jun. 18, 1991

[54] DIFFERENTIAL PRESSURE TRANSDUCER

[75] Inventors: Robert A. Van Fossen, Auburn, Ind.; Scott L. Spence, Port Washington, Wis.; Donald E. DeWitt, Syracuse, Ind.

[73] Assignee: Johnson Service Company, Milwaukee, Wis.

[21] Appl. No.: 534,457

[22] Filed: Jun. 7, 1990

[51] Int. Cl.⁵ ............................................. F01M 11/10
[52] U.S. Cl. .................................. 184/108; 73/722; 417/13; 417/19; 184/6.4
[58] Field of Search ............... 184/6.4, 108; 417/13, 417/19, 38, 44; 73/722, 728; 340/626, 451

[56] References Cited

U.S. PATENT DOCUMENTS

| | | | |
|---|---|---|---|
| 3,761,958 | 9/1973 | Nishira | 73/728 |
| 3,884,079 | 5/1975 | Turtle et al. | 73/722 |
| 4,124,331 | 11/1978 | Taki | 417/19 |
| 4,551,069 | 11/1985 | Gilmore | 417/13 |
| 4,672,231 | 6/1987 | Sutton et al. | 417/13 |

FOREIGN PATENT DOCUMENTS 0191485  11/1982  Japan ......................... 417/38

Primary Examiner—Stephen F. Husar
Assistant Examiner—Alan B. Cariaso
Attorney, Agent, or Firm—Foley & Lardner

[57] ABSTRACT

A differential pressure sensor indicating a housing forming a high pressure chamber, a nozzle mounted on the housing at one end of the chamber, a diaphragm mounted in the chamber to form a low pressure chamber in the nozzle, a spring retainer in the high pressure chamber, a spindle connected to the diaphragm, a tension spring connecting the spindle to the spring retainer, a circular magnet mounted on the spindle and a transducer mounted on the housing to sense the position of the magnet.

14 Claims, 1 Drawing Sheet

DIFFERENTIAL PRESSURE TRANSDUCER

FIELD OF THE INVENTION

This invention relates generally to pressure sensing devices and more particularly to a pressure sensing device for a refrigerant compressor system which is responsive to the pressure differential between the discharge pressure and the crankcase pressure of the oil pump for the refrigerant compressor.

BACKGROUND OF THE INVENTION

In large sealed refrigeration compressor systems it is conventional to monitor lubrication pressure generated by the compressor oil pump in order to prevent compressor operation when there is insufficient lubrication pressure to lubricate the compressor which could cause unnecessary wear and seizing of the compressor. Generally, lubrication pressure is monitored by determining the pressure differential between the crankcase and the output or discharge side of the compressor oil pump. The difficulty in monitoring this differential is due primarily to the variation in crankcase pressures which are dependent on temperature and type of thermal characteristic of the refrigerant system.

In U.S. Pat. No. 4,551,069 a piston is shown disposed in a tube separating the interior of the tube into a high pressure portion which communicates with the output of the oil pump and a low pressure portion which communicates with the suction side of the oil pump. The piston is biased by a compression spring to move into engagement with a movable contact arm for a switch which signals loss of pressure. The switch is closed whenever the discharge pressure exceeds the combined force of the compression spring and crankcase pressure. However, this arrangement results in excessive wear of the movable sensor parts due to the continuous movement of the piston with the cyclic pressure fluctuations mentioned above as well as a need for some way to prevent nuisance tripping of the compressor motor if it is to be used to control the energization of the motor as stated in the patent.

In U.S. Pat. No. 4,672,231 a shuttle is mounted within a bore in a cylindrical housing. The shuttle includes a magnet in one end and is biased by a compression spring toward the end of the bore in the cylinder. The magnet is used to operate a reed switch to turn the compressor on or off depending on the pressure differential between the discharge pressure of the oil pump and the combined force of the compression spring and the crankcase pressure. The shuttle is mounted in close contact with the bore in the cylinder to provide a circuitous high pressure flow path through the bore so that the reaction time of the shuttle is delayed in order to minimize the on and off operation of the compressor.

In both of these devices, flow is across the moving part which allows debris to collect on the inlet screen on the high pressure side of the pump. It should also be noted that both devices use compression springs to bias the pistons which are subject to buckling or uneven closure. This can produce dragging of the magnet with the inner bore causing friction and/or hysteresis.

SUMMARY OF THE PRESENT INVENTION

The pressure sensing device in accordance with the present invention uses a Hall effect sensor to sense the position of a magnet which is connected to a diaphragm that responds to the differential pressure between the discharge pressure and the crankcase pressure of the oil pump. The magnet is suspended within a housing between a tension spring and the diaphragm. The movement of the magnet within the housing is therefore frictionless due to the centering action caused by the tension spring and provides immediate response to variations in differential pressure.

The primary object of the invention is to provide a control means which can control energization of a compressor motor based on an immediate response to a pressure drop between pressure generated by the oil pump and the combined force of the tension spring and the crankcase pressure.

A primary advantage of the pressure sensing device is the elimination of any frictional forces in the movement of the magnet within the housing of the pressure sensor.

Other principal features and advantages of the invention will become apparent to those skilled in the art upon review of the following drawings, the detailed description and the appended claims.

DETAILED DESCRIPTION OF THE DRAWINGS

Figure 1:
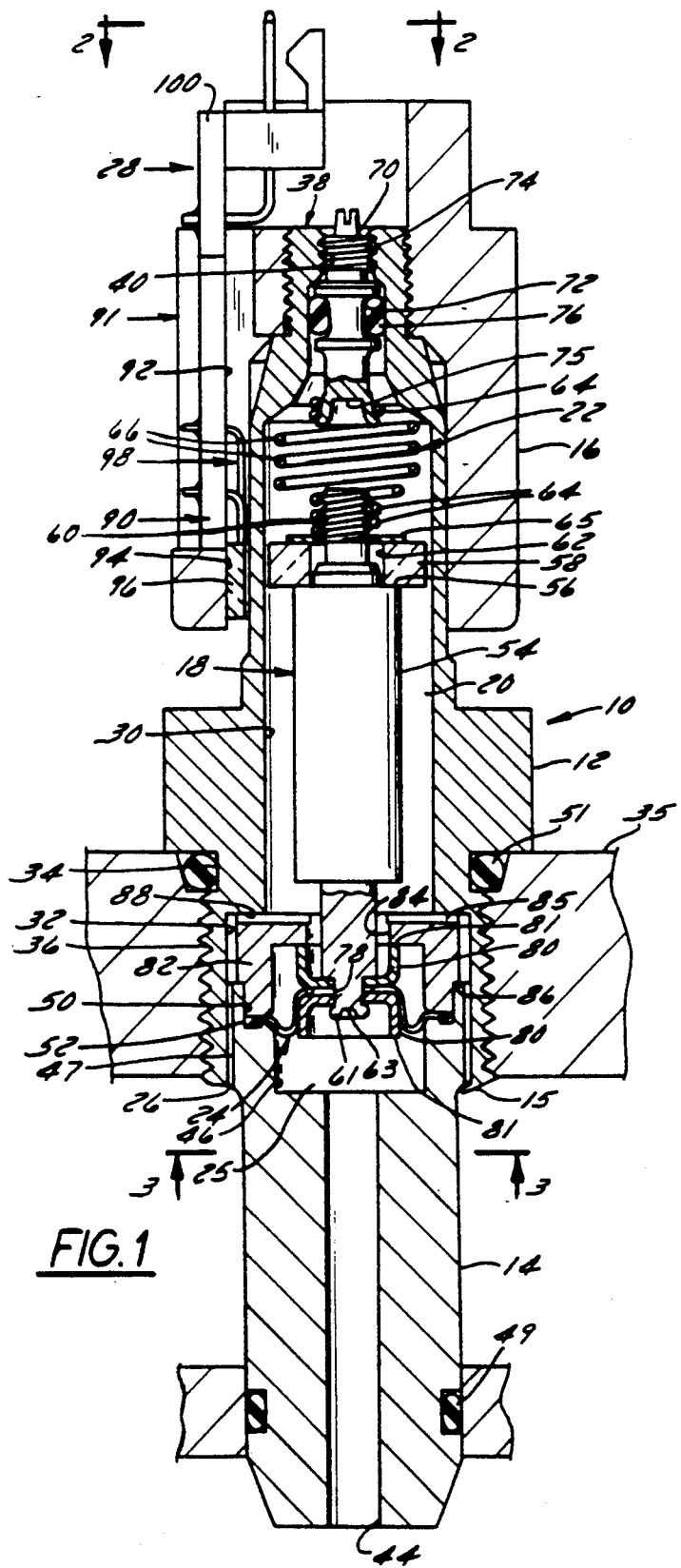
FIG. 1 is a cross-sectional view of the pressure sensor shown mounted in the oil pump housing.
Figure 2:
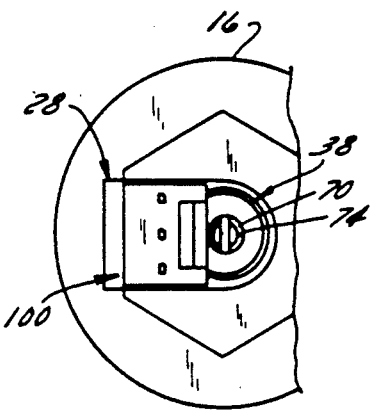
FIG. 2 is a view taken on line 2—2 of FIG. 1 showing the connection of the Hall effect sensor to the printed circuit board.
Figure 3:
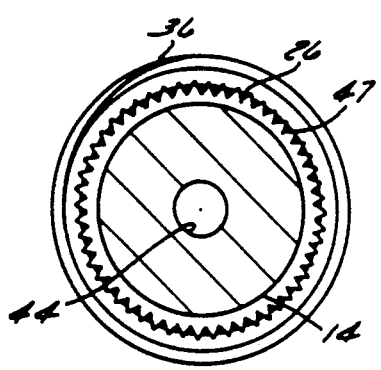
FIG. 3 is a view taken on line 3—3 of FIG. 1 showing the high pressure inlet ports to the pressure chamber.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DETAILED DESCRIPTION OF THE PREFERRED EMBODIMENTS

The pressure sensing device 10 as seen in FIG. 1 includes a main body 12, a probe or nozzle 14 and a cover 16. A magnet carrier assembly 18 is suspended within a chamber 20 in the main body 12. The magnet carrier assembly 18 is supported by means of a tension spring 22 and a diaphragm 24. The diaphragm 24 separates the chamber 20 from a low pressure chamber 25 in the probe 14. High pressure fluid from the discharge side of the pump is admitted into the chamber 20 through flow paths 26 provided around the nozzle 14. Low pressure fluid is admitted to chamber 25 through bore 44 in nozzle 14. Under normal operating conditions, the high pressure fluid in chamber 20 will move the magnet carrier 18 downward in FIG. 1, overcoming the combined force of the tension spring 22 and the pressure in chamber 25. If the pressure drops in the chamber 20, the magnet carrier assembly 18 will move upward in FIG. 1. The movement of the magnet carrier assembly 18 is sensed by a Hall effect sensor assembly 28 provided in the cover 16 to turn off the compressor via an electronic control circuit (not shown) if the lubricating oil pressure drops below a predetermined minimum.

The main body 12 is generally cylindrical in form and is made from a non-magnetic material such as brass. The body includes a bore 30 which defines the pressure chamber 20 and a counterbore 32. A reduced diameter section 34 is provided at the lower end of the main body which is provided with screw threads 36 for mounting in the pump housing 35. The other end of the main body 12 is closed by a head 38 having a threaded bore 40. A plastic housing with threaded attachment to the upper portion of the main body supports the Hall effect sensor assembly 28 as described hereinafter.

The probe 14 includes the passage or bore 44 which is connected to a counterbore 46 that defines the low pressure chamber 25. A knurled section 47 is provided around the upper end of the probe 14 which forms a part of the flow path 26, as described hereinafter. A counterbore 50 is provided at the upper end of the probe to define a diaphragm seat 52. The probe 14 extends through the pump housing 35 so that the bore 44 can be connected to the crankcase. Seals 49 and 51, presently a soft copper washer, are provided on probe 14 to seal the housing 35.

The magnet carrier assembly 18 includes a rod 54 having a flange 56 at one end defining a seat for a magnet 58. The magnet 58 is in the form of a ring having a center bore 62 that has a locational fit on the end of the rod 54. A threaded section 60 is provided at the upper end of the carrier 18 and a reduced diameter pin 61 is provided at the lower end. A blind bore 63 is provided in the end of pin 61.

The carrier assembly 18 is suspended in the chamber 20 between the tension spring 22 and the diaphragm 24. In this regard, the tension spring 22 is in the form of a coil spring having two small diameter coils 64 at each end and two or more large diameter coils 66 intermediate the ends. The small diameter coils 64 at the lower end are screwed onto the threaded end 60 of the rod 54. The magnet 58 is secured to the rod 54 by means of a washer 65 which is seated on the magnet by the coils 64 at the lower end of spring 22.

The small diameter coils 64 at the upper end are secured to an adjustment screw 70 which is mounted in the threaded bore 40 in the head 38. The screw 70 is provided with a groove 72 and a threaded section 74 at one end and a blind bore 75 in the other end. The adjustment screw 70 is sealed within the threaded bore 40 by means of 0 ring seal 76 mounted in groove 72. The coils 64 are secured to the end of the screw 70 by expanding the edges of the blind bore 75 at the end of the screw. This allows the screw to turn within the coils of the spring 64 for adjusting the tension on spring 22.

The diaphragm 24 includes a central opening 78 and is mounted on the pin 61 at the end of the rod 54. The diaphragm is formed from a molded flexible material such as epichlorohydrin copolymer. In this regard, a pair of diaphragm retainers 80 having cup-shaped walls 81 are mounted on the rod 54 above and below the diaphragm 24. The retainers 80 are locked on the rod by expanding the end of the pin 61 around the bore 63. The retainers 80 should be clamped together with sufficient force to sealingly secure the diaphragm to the rod 54. The retainers 80 also include means for limiting the motion of the carrier assembly 18 in the housing to prevent damage to the diaphragm. Such means is in the form of the retainer walls 81 which are positioned to engage a clamp ring 82 and the end of the chamber 25 in nozzle 14.

The outer edge of the diaphragm 24 is secured to the shoulder 52 in the counter bore 50 by means of the clamp ring 82. The ring 82 includes a central bore 84 and a shoulder 86 around the outside of the ring 82. The ring 82 includes a number of slots 85 in the upper face. The ring 82 is positioned in the counter bore 50 to clamp the edge of the diaphragm 24 against the shoulder 52 in the bore 50. The ring 82 is clamped into position when the nozzle 14 is forced into the counter bore 32 of the main body 12 far enough for the ring 82 to engage shoulder 88 on the end of counter bore 32. The edge of the diaphragm 24 is protected by means of the shoulder 86 on the ring 82 which engages the upper end of the nozzle 14. This prevents overstressing of the edge of the diaphragm when the nozzle 14 is locationally fit into bore 32 in the main body 12. The main body is staked at a number of circumferential locations 15 around nozzle 14.

It should be noted that the knurled section 47 and the slots 85 in ring 82 form diverse flow paths 26 into the bore 20. With this arrangement, pressure fluctuations encountered in the oil pressure are throttled to better control the pressure in the bore 20.

The Hall effect sensor assembly 28 used herein is of the type shown and described in U.S. Pat. No. 4,606,229 entitled Differential Pressure Transmitter, issued on Aug. 19, 1986, assigned to the same assignee. This type of sensor includes a transducer 90 which includes a panel support 91 having a planar face 92 and a sensing face 94 on which is disposed a sensing element 96. The transducer 90 is positioned on the outer diameter of the body in sensing relationship to the magnetic ring 58. The lead wires 98 from the transducer are connected to a circuit board 100 held by the panel support 91. The output signal from the transducer is used to provide a signal indicating a change in the differential pressure between the oil discharge pressure and crankcase pressure. When the oil pump is generating more pressure than the combined forces of the tension spring and the crankcase pressure, the carrier assembly 18 will be in the lowermost position indicating normal lubricating pressure. When the differential pressure decreases so that the combined forces of the tension spring and crankcase pressure move the carrier upward, the transducer will initially provide a warning signal indicating the change and will indicate the need to the electronic controller to turn the compressor off if there is a loss of lubricating pressure.

It should be noted that the rod 54 and magnet 58 are suspended between the tension spring 22 and the diaphragm 24. The response of the carrier assembly 18 to pressure changes is thereby immediate and not impeded by any physical contact with any other structure. The magnet 58 is in the form of a ring so that the carrier can be mounted in any position within the chamber 20 without any change in the response characteristic of the transducer 90.

Thus, it should be apparent that there has been provided in accordance with the present invention a differential pressure transducer that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A differential pressure sensing device for monitoring the pressure differential between the discharge pressure and the crankcase pressure of a lubricating pump for a compressor, said device comprising:
   a housing having a high pressure chamber,
   a nozzle mounted on said housing and having a low pressure chamber,
   a diaphragm separating said high pressure chamber from said low pressure chamber,
   a tension spring mounted in said high pressure chamber,
   a magnet carrier assembly connecting said spring to said diaphragm, means in said device for connecting said high pressure chamber to the discharge side of said lubricating oil pump, means in said device for connecting said low pressure chamber to the crankcase, and
   means mounted in said housing for sensing the axial position of said magnet carrier assembly.

2. The device according to claim 1 wherein said magnet assembly includes a carrier and a ring magnet having an angular disposition of which does not affect the response characteristics of said sensing means.

3. The device according to claim 1 including means for adjusting the differential pressure response.

4. The device according to claim 1 wherein said high pressure connecting means includes a knurled section defining a high pressure flow path to said high pressure chamber.

5. The device according to claim 1 including means for limiting the motion of said carrier assembly.

6. The device according to claim 5 wherein said limiting means including a retainer mounted on each side of said diaphragm for sealing said diaphragm on said rod.

7. A pressure differential sensor comprising:
   a housing,
   a chamber in said housing,
   a device mounted on one end of said housing,
   said device including means for connecting said chamber to a high pressure source,
   a diaphragm mounted in said device for separating said chamber in said housing from said device,
   means in said device for connecting said diaphragm to a low pressure source,
   a rod positioned in said high pressure chamber and being connected to respond to the movement of said diaphragm,
   a tension spring connecting said rod to said housing whereby said rod is centered and free to move with said diaphragm, and
   means mounted on said rod for indicating the position of said rod in response to changes in the pressure differential between said chambers.

8. The sensor according to claim 7 including means for monitoring the position of said indicating means.

9. The sensor according to claim 7 including means for limiting the motion of said spindle to prevent overstressing of the diaphragm.

10. The sensor according to claim 7 including means for adjusting the tension of the spring to vary the response characteristic of said rod.

11. A differential pressure sensor comprising:
    a housing having a chamber,
    a threaded opening at one end of said chamber,
    a nozzle mounted in said housing at the other end of said chamber,
    a spindle positioned in said chamber in said housing,
    a diaphragm mounted on one end of said spindle and being connected to said nozzle to define a low pressure chamber in said nozzle and a high pressure chamber in said housing,
    a spring retainer mounted in said threaded opening in said one end of said chamber, and
    a tension spring connecting said spindle to said retainer,
    a magnet mounted on said spindle, and
    means mounted on said housing for sensing the position of said magnet in said chamber.

12. The sensor according to claim 11 wherein said nozzle includes a knurled section for defining a flow path into said high pressure chamber and a bore through said nozzle for defining a flow path into said low pressure chamber.

13. The sensor according to claim 12 including means for limiting the motion of said spindle in said chamber.

14. A pressure sensing device for monitoring the pressure differential between the lubricating oil discharge pressure and the crankcase pressure in a compressor, said device comprising a housing having a chamber,
    a device mounted on said housing, said device including passage means for connecting said chamber to discharge pressure and a bore in said device connected to said crankcase,
    a diaphragm in said housing separating said chamber from said bore,
    a spindle mounted in said chamber and being connected to said diaphragm,
    a tension spring connected to said spindle and to said housing whereby said spindle is suspended in said chamber between said diaphragm and said spring, and
    means mounted on said spindle for indicating the position of said spindle in said housing.

* * * * *

UNITED STATES PATENT AND TRADEMARK OFFICE
CERTIFICATE OF CORRECTION

PATENT NO. : 5,024,294

DATED : June 18, 1991

INVENTOR(S) : Robert A. Van Fossen et al.

It is certified that error appears in the above-identified patent and that said Letters Patent is hereby corrected as shown below:

Column 5:
In claim 2, line 3, the word "of" should be deleted.

Signed and Sealed this

Third Day of November, 1992

Attest:

DOUGLAS B. COMER

*Attesting Officer*  *Acting Commissioner of Patents and Trademarks*

UNITED STATES PATENT AND TRADEMARK OFFICE
CERTIFICATE OF CORRECTION

PATENT NO. : 5,024,294
DATED : June 18, 1991
INVENTOR(S) : Van Fossen et al.

It is certified that error appears in the above-indentified patent and that said Letters Patent is hereby corrected as shown below:

Column 5, line 43:

In claim 7, line 4, the word "device" should be --probe--;

Column 5, line 44:

line 5, the word "device" should be --probe--;

line 7, the word "device" should be --probe--;

line 8, the word "device" should be --probe--; and line 9, the word "device" should be --probe--.

Column 6. line 41:

In claim 14, line 6, both occurrences of "device" should be --probe--; and line 43, the word "device" should be --probe--.

Column 5, line 26, delete "of".

Signed and Sealed this

Eleventh Day of July, 1995

Attest:

BRUCE LEHMAN

*Attesting Officer*       *Commissioner of Patents and Trademarks*